(12) United States Patent
Pfeffer et al.

(10) Patent No.: US 7,916,037 B2
(45) Date of Patent: Mar. 29, 2011

(54) METHOD AND DEVICE FOR RECOGNITION OF THE SEAT OCCUPANCY OF A SEAT

(75) Inventors: Bernhard Pfeffer, Bischofsmais (DE); Gerald Schicker, Maxhütte-Haidhof (DE); Gerd Winkler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 345 days.

(21) Appl. No.: 12/278,187

(22) PCT Filed: Jan. 31, 2007

(86) PCT No.: PCT/EP2007/050930
§ 371 (c)(1), (2), (4) Date: Oct. 8, 2008

(87) PCT Pub. No.: WO2007/090770
PCT Pub. Date: Aug. 16, 2007

(65) Prior Publication Data
US 2009/0066530 A1   Mar. 12, 2009

(30) Foreign Application Priority Data
Feb. 3, 2006 (DE) .......................... 10 2006 005 047

(51) Int. Cl.
*G08B 21/00* (2006.01)

(52) U.S. Cl. ....................................... 340/667; 340/561
(58) Field of Classification Search ................. 340/561, 340/660, 943; 701/1, 45, 300
See application file for complete search history.

(56) References Cited

U.S. PATENT DOCUMENTS
7,578,198 B2 * 8/2009 Lichtinger et al. .............. 73/768
* cited by examiner

*Primary Examiner* — Shirley Lu
(74) *Attorney, Agent, or Firm* — Laurence A. Greenberg; Werner H. Stemer; Ralph E. Locher

(57) ABSTRACT

The recognition of seat occupancy of a seat is achieved by recording at least one measured signal by way of a seat occupancy sensor. The measured signal is allocated a weight signal by way of an allocation rule, which is representative of a weight with which the seat is occupied. The allocation rule is altered when the weight signal over the course of time is first greater than a given upper threshold and when further, during a given first duration the weight signal lies in a first weight range at a weight zero value. The allocation rule is altered such that the then current measured signal is allocated the weight signal reduced by a given percentage from the weight signal. The allocation rule is further altered when the weight signal lies around the weight zero value in a given second weight range during a given second duration, which is much longer than the first duration. The allocation rule is altered such that the then current measured signal is allocated a weight signal reduced by a given correction value.

9 Claims, 3 Drawing Sheets

METHOD AND DEVICE FOR RECOGNITION OF THE SEAT OCCUPANCY OF A SEAT

Figure 1:
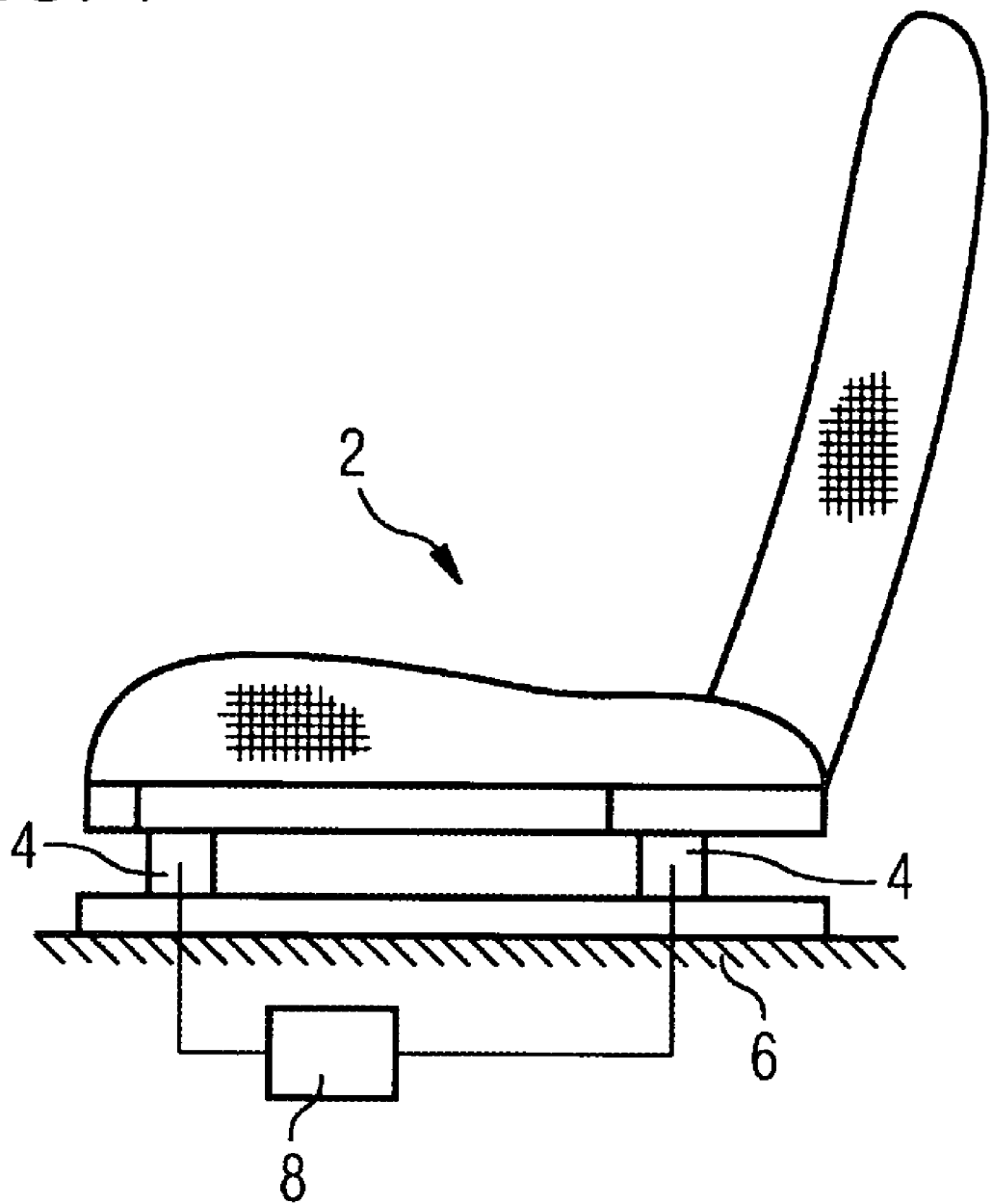

The invention relates to a method and a device for recognition of the seat occupancy of a seat. To recognize the seat occupancy a measuring signal is detected by means of a seat occupancy sensor system. The measuring signal is allocated to a weight signal by means of an allocation rule. The weight signal is representative of a weight with which the seat is occupied.

A method and a device for detecting and processing weight forces acting on a vehicle seat for determining the mass of an occupant sitting on the seat cushion of the vehicle seat is known from EP 1 383 667 B1. Weighing signals are detecting by sensors arranged on the vehicle seat. An absolute overall weighing signal is formed from the weighing signals. The overall weighing signal corresponds to the weight force exerted by the mass of the occupant on the seat. When no load is imposed on the vehicle seat a correction of the zero point of the weighing signals based on weighing signals of the force measurement cells is undertaken. The zero point correction is undertaken so that, for each force measurement cell a last valid weighing signal for a non-loaded vehicle seat is stored and compared with the weighing signal of the subsequent valid measurement for a non-loaded seat. Depending on the comparison the zero point is corrected.

BRIEF SUMMARY OF THE INVENTION

The object of the invention is to create a method and a device which respectively make it possible to precisely recognize the seat occupancy of a seat.

The object is achieved by the features of the independent claims. Advantageous embodiments of the invention are specified in the subclaims.

The invention is characterized by a method and a device for recognition of the seat occupancy of a seat. To recognize the seat occupancy at least one measuring signal is detected by means of a seat occupancy sensor system. The measuring signal is allocated to a weight signal by means of an allocation rule. The weight signal is representative of a weight with which the seat is occupied. The allocation rule is adapted if the weight signal over the course of time is initially greater than a predetermined upper threshold value and if subsequent to this the weight signal lies during a predetermined first duration in a first weight range around a zero weight value. In this case the allocation rule is adapted such that the then current measuring signal is allocated to a weight signal correspondingly reduced in amount by a predetermined percentage proportion of the weight signal. The allocation rule is further adapted if the weight signal lies in a predetermined second weight range around the zero weight value during a predetermined second duration. In this case the allocation rule is adapted such that the then current measuring signal is allocated to a weight signal correspondingly reduced in amount by a predetermined correction value. The predetermined second duration is far greater than the first duration.

If the occupancy of the seat changes frequently, the allocation of the measuring signal to the weight signal reduced in amount by a predetermined percentage proportion of the weight signal makes it possible, despite wear on the seat and/or the seat occupancy sensor, for the seat occupancy to be precisely detected. If the occupancy of the seat does not change over a long period of time, the allocation of the measuring signal to a weight signal correspondingly reduced in amount by a predetermined correction value, makes it possible, despite wear on the seat and/or the seat occupancy sensor, for the seat occupancy to be precisely detected. Both adaptation options of the allocation rule together thus make it possible, with a weight on the seat which changes frequently and/or with a constantly low weight and/or with no weight at all on the seat, to adapt the allocation rule and thereby contribute to an especially precise recognition of the seat occupancy.

In an advantageous embodiment of the method a number of measuring signals are detected by means of the seat occupancy sensor. The number of measuring signals is allocated by means of the allocation rule to the weight signal. This contributes to an especially precise adaptation of the allocation rule.

In a further advantageous embodiment of the method the measuring signal is allocated to the weight signal reduced in amount by a predetermined percentage proportion of the weight signal if the weight signal over the course of time is initially greater for a predetermined third duration of time than the predetermined upper threshold value. This contributes to a precise recognition of the unoccupied seat.

In a further advantageous embodiment of the method, the first and/or the third duration lies with a first range of between 0.1 and five seconds. This contributes to a precise recognition of the unoccupied seat and to a precise adaptation of the allocation rule.

In a further advantageous embodiment of the method the second duration lies within a second range of between one and 30 minutes. This contributes to a precise recognition of the unoccupied seat and to a precise adaptation of the allocation rule.

In a further advantageous embodiment of the method the first and/or the second weight range comprise around three kilograms. This contributes to a precise recognition of the unoccupied seat and to a precise adaptation of the allocation rule.

In a further advantageous embodiment of the method the correction value ranges between one and ten grams. This contributes to a precise recognition of the unoccupied seat and to a precise adaptation of the allocation rule.

The advantageous embodiments of the method can easily be transferred to advantageous embodiments of the device for recognizing the seat occupancy of the seat. The invention is explained below in greater detail on the basis of schematic drawings.

Figure 2:
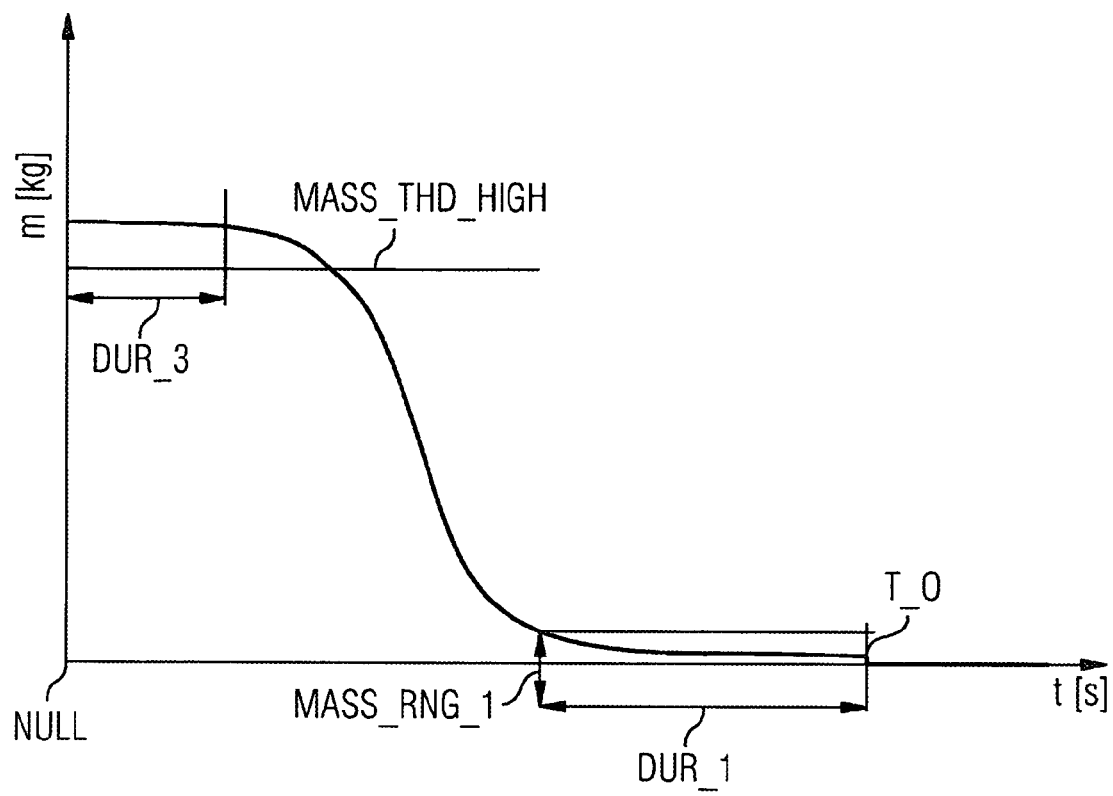
Figure 3:
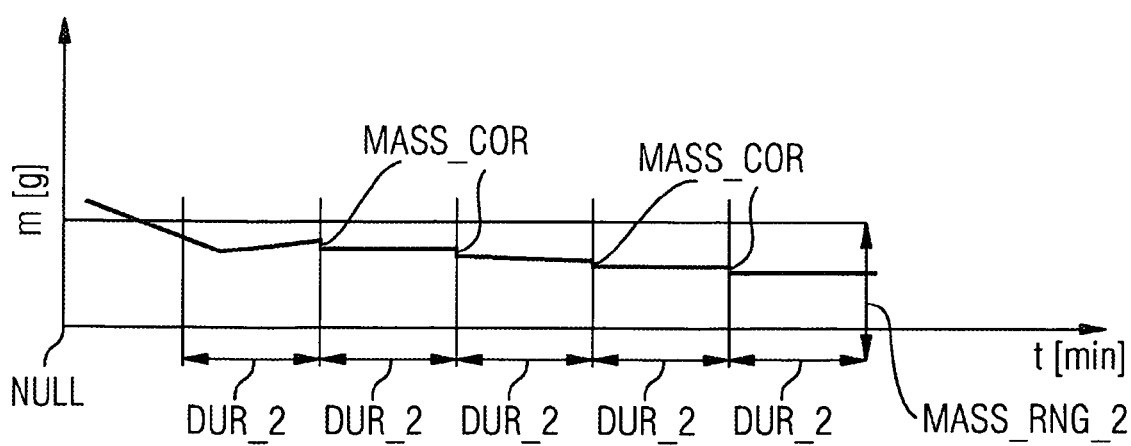
Figure 4:
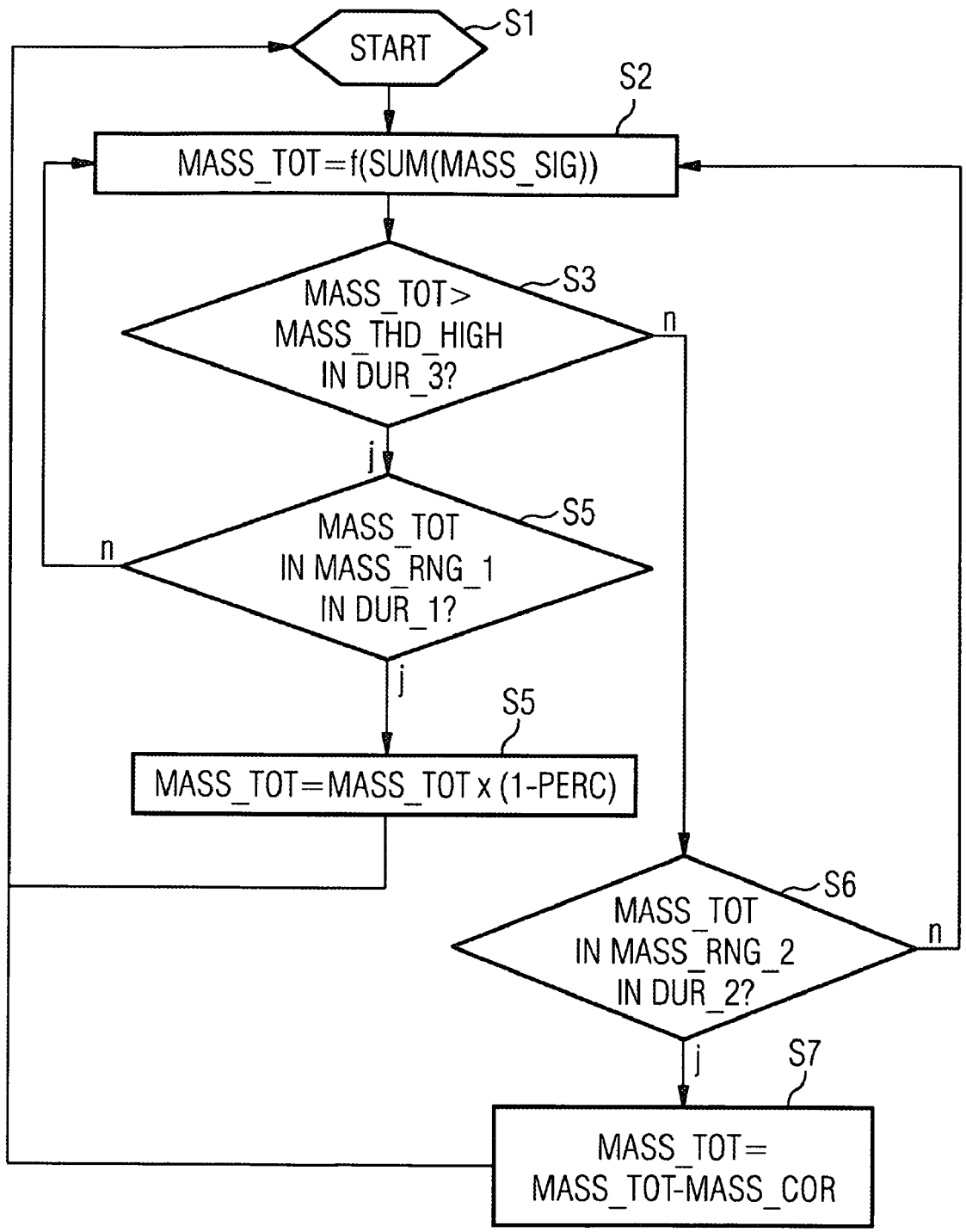

The figures show:
FIG. 1 a seat;
FIG. 2 a first timing curve of a weight signal,
FIG. 3 a second timing curve of the weight signal,
FIG. 4 a flowchart of a program for recognizing a seat occupancy of the seat.

DESCRIPTION OF THE INVENTION

Elements with identical construction or which function in the same way are identified by the same reference symbols in all figures.

A seat 2 (FIG. 1) comprises a seat cushion and preferably a backrest. The seat 2 is fixed to a body which is stationary relative to the seat 2. Preferably the stationary body is a motor vehicle 6. The motor vehicle 6 includes the seat 2 and a seat occupancy sensor system. The seat occupancy sensor system is used to recognize a weight with which the seat 2 is occupied. The seat occupancy sensor system includes at least one, preferably a number of weight sensors 4. The weight sensors 4 are coupled to the seat 2 and the motor vehicle 6 so that the weight with which the seat is occupied can be detected through them.

The motor vehicle 6 further includes an evaluation facility 8, which is preferably coupled electrically to the weight sensors 4. The evaluation facility 8 is used for receiving a measuring signal MASS_SIG of the weight sensors 4 and for allocation of the measuring signal MASS_SIG by means of an allocation rule to a weight signal MASS_TOT which is representative of the weight with which the seat 2 is occupied. The evaluation facility 8 can also be referred to as a device for recognizing the seat occupancy of the seat 2. Alternatively the evaluation facility 8 can be integrated into a device for operating an internal combustion engine of the motor vehicle.

A first timing curve (FIG. 2) of the weight signal MASS_TOT for example represents a person who is sitting on the seat 2 getting out of the motor vehicle 6. In the timing curve of the weight signal MASS_TOT the weight signal MASS_TOT is initially greater than an upper threshold value MASS_THD_HIGH. Subsequently the weight signal MASS_TOT falls relatively quickly. If the weight signal MASS_TOT subsequent to the fall lies within a first weight range MASS_RNG_1 subsequent to the fall for a predetermined first duration DUR_1, this is representative of the seat 2 being unoccupied after the person has got out. The first weight range MASS_RNG_1 can for example be three kilograms.

If the weight signal MASS_TOT lies in the first weight range MASS_RNG_1 and does not correspond exactly to a zero weight value NULL for the unoccupied seat 2 after the person has got out, the allocation rule is adapted which allocates the weight signal MASS_TOT to the measuring signal MASS_SIG. In this case the allocation rule is adapted such that the current measuring signal MASS_SIG at a point in time T 0 is allocated to a weight signal MASS_TOT reduced in amount by a predetermined percentage proportion PERC of the current weight signal MASS_TOT. The percentage proportion PERC preferably lies in the region of ten percent of the current weight signal MASS_TOT or less. For example, If the percentage proportion PERC amounts to ten percent, the current measuring signal MASS_SIG, which before the percentage adaptation of the allocation rule was allocated the weight signal MASS_TOT equivalent to one kilogram, after the adaptation of the allocation rule is allocated the weight signal MASS_TOT equivalent to 900 grams.

Preferably the allocation rule is only adapted after the person gets out of the seat if the weight signal MASS_TOT, before dropping below the upper threshold value MASS_THD_HIGH, lies above the upper threshold value MASS_THD_HIGH for a predetermined third duration DUR_3. This contributes to the fact that an exceeding of the upper threshold value MASS_THD_HIGH by the weight signal MASS_TOT because of a disruptive factor is not allocated to a person getting out of the seat. This contributes to especially precise recognition of the seat occupancy. The disruptive factor can be an incorrect measuring signal MASS_SIG for example. The incorrect measuring signal MASS_SIG can for example be caused by an electronic fault and/or by abrupt braking, through which the seat 2, because of its inertial mass, acts on the weight sensors 4.

Preferably the first and/or the third duration DUR_1, DUR_3 lie with a first period of time of between 0.1 and five seconds. The first and/or the third duration DUR_1, DUR_3 can however also lie outside the first of the first time period if it this is useful for recognition of the unoccupied seat 2, for example after person has got out of the motor vehicle 6.

If the seat 2 is unoccupied or is almost unoccupied for a second duration DUR_2 (FIG. 3), the allocation rule is likewise adapted. Almost unoccupied in this context means that the weight signal MASS_TOT in a second weight range lies around the zero weight value NULL. The second duration DUR_2 is far longer than the first duration DUR_1. The second duration DUR_2 can for example lie in a second time period of between one and 30 minutes. The second duration DUR_2 can however also lie outside the second time period. For example the second duration DUR_2 can last for a number of days.

If the seat 2 is unoccupied or is almost unoccupied for a second duration DUR_2, for example because the seat 2 is occupied by a child seat, the allocation rule is adapted in parts so that after each expiry of the second duration DUR_2 the measuring signal MASS_SIG is allocated to a weight signal MASS_TOT reduced in each case by a correction value MASS_COR. The correction value MASS_COR can for example lie with a range of between one and ten grams. If the current weight signal MASS_TOT is greater than the zero weight value NULL, the part adaptation of the allocation rule is synonymous with a part adaptation of the allocation rule in which the zero weight value NULL is assigned to a measuring signal MASS_SIG which before the adaptation of the allocation rule was assigned the zero weight value NULL plus the correction value MASS_COR. If the current weight signal MASS_TOT is less than the zero weight value NULL, the part adaptation of the allocation rule is synonymous with a part adaptation of the allocation rule in which the zero weight value NULL is assigned to a measuring signal MASS_SIG, which before the adaptation of the allocation rule was assigned the zero weight value minus the correction value MASS_COR. The effect of this type of step-by-step adaptation of the allocation rule is that after a period of a few days has elapsed for example, the seat 2 occupied by the child seat is recognized as unoccupied. If a child is then placed in the child seat, only the child is recognized as the seat occupancy of the seat 2.

The percentage adaptation of the allocation rule after the person gets out of the vehicle for example and the step-by-step adaptation of the allocation rule make it possible to compensate for wear in the seat occupancy sensor and/or possibly wear in the seat 2. Wear in the seat 2 can for example be relevant for an alternate embodiment of the seat 2 in which the weight sensors 4 are arranged in the seat cushion of the seat 2. With such an embodiment of the seat 2 a part of the weight force of the seat 2 is transferred directly from the seat to the motor vehicle 6. The proportion of the weight which is recognized by the weight sensors 4 then depends inter alia on the seat 2 materials used and on wear therein. For example springs in the seat 2, in their new state can transfer a greater proportion the weight force to the motor vehicle 6 than they will do for example after a number of years have elapsed.

A program for detecting the seat occupancy of the seat 2 is preferably stored in the evaluation facility 8. The program is preferably started close to the time that the internal combustion engine is started in a step S1, in which variables are initialized if necessary.

In a step S2 the weight signal MASS_TOT is determined as a function of at least one, preferably of a number of measuring signals MASS_SIG of the weight sensors 4. If there are a number of weight sensors 4, the weight signal MASS_TOT is preferably determined as a function of the sum SUM of the measuring signals MASS_SIG. Alternatively part weight signals can also be determined with reference to the allocation rule as a function of the measuring signals MASS_SIG, and the weight signal MASS_TOT can then be determined depending on the sum SUM of the part weight signals.

The weight signal MASS_TOT is determined with reference to the allocation rule. The allocation rule can for example be predetermined by an engine map. If necessary for adapting the allocation rule an origin of the engine map can be displaced along an axis of the engine map. The engine map can for example be recorded on a test bed and stored in the evaluation facility 8.

In a step S3 a check is made as to whether the weight signal MASS_TOT is preferably greater over the third duration DUR_3 than the upper threshold value MASS_THD_HIGH. If the condition of step S3 is fulfilled, this means for example that the seat 2 is occupied by the person. The processing is then continued at a step S4. If the conditions of step S3 are not fulfilled the processing is continued in a step S6.

In step S4 a check is made as to whether the weight signal MASS_TOT lies during the first duration DUR_1 within the first weight range MASS_RNG_1. If the conditions of step S4 are not fulfilled the processing is continued in step S2. If the condition of step S4 is fulfilled, this means for example that the seat 2 is probably unoccupied. The processing is then continued at a step S5.

In step S5 the allocation rule is adapted such that the current measuring signal MASS_SIG is assigned to the zero weight value NULL of the weight signal MASS_TOT.

In step S6 as check is made whether the weight signal MASS_TOT lies during the second duration DUR_2 in the second weight range MASS_RNG_2. If the conditions of step S6 are not fulfilled the processing is continued in step S2. If the conditions of the step S6 are fulfilled, this means that the seat 2 is only slightly occupied or not occupied at all during the second duration DUR_2. The processing is then continued at a step S7.

In step S7 the current measuring signal MASS_SIG of the weight sensors 4 is allocated to the weight signal MASS_TOT reduced by the correction value MASS_COR. The allocation rule can in this connection for example be adapted so that a weight of somewhat below a kilogram on the seat 2 within six months is compensated for, so that after six moths the seat 2 occupied by the weight of somewhat below a kilogram produces a weight signal MASS_TOT which is representative for the unoccupied seat 2.

The invention is not restricted to the features of the specified embodiments. For example the weight sensors 4 can be arranged in any manner, provided they make it possible for the seat occupancy of the seat 2 to be recognized. Furthermore the durations DUR_1, DUR_2, DUR_3 can be suitably adapted. Furthermore the first weight range MASS_RNG_1 and the second weight range MASS_RNG_2 can coincide. Furthermore the first weight range MASS_RNG_1 and/or the second weight range MASS_RNG_2 can be embodied symmetrically or asymmetrically to the zero weight value NULL. Furthermore for example, because of the wear, the weight signal MASS_TOT can be smaller than the zero weight value NULL. The allocation rule is then correspondingly adapted such that the adaptation of the allocation causes the amount of the weight signal MASS_TOT to move back closer to the zero weight value NULL.

The invention claimed is:

1. A method for recognizing a seat occupancy of a seat, which comprises:
    detecting at least one measuring signal by way of a seat occupancy sensor system;
    allocating the measuring signal by an allocation rule to a weight signal that is representative of a weight with which the seat is occupied;
    adapting the allocation rule when the weight signal over time is greater than a predetermined upper threshold value and if subsequently the weight signal during a predetermined first duration lies in a first weight range about a zero weight value, then the allocation rule is adapted such that a then-current measuring signal is allocated to a weight signal reduced in amount by a predetermined percentage proportion of the weight signal;
    adapting the allocation rule if the weight signal over the course of time is initially smaller than the predetermined upper threshold value and if subsequently the weight signal lies in a predetermined second weight range about the zero weight value during a predetermined second duration, which is greater than the first duration, wherein the allocation rule is adapted such that a then-current measuring signal is allocated to a weight signal reduced in amount by a predetermined correction value.

2. The method according to claim 1, which comprises detecting with the seat occupancy sensor system a plurality of measuring signals and allocated the plurality of measuring signals to the weight signal by way of the allocation rule.

3. The method according to claim 1, which comprises allocating the measuring signal to the weight signal reduced in amount by the predetermined percentage proportion of the weight signal if the weight signal over the course of time is initially greater for a predetermined third duration than the predetermined upper threshold value.

4. The method according to claim 3, wherein at least one of the first duration and the third duration lie in a first time period of 0.1 to 5 seconds.

5. The method according to claim 1, wherein the first duration lies in a first time period of 0.1 to 5 seconds.

6. The method according to claim 1, wherein second duration lies in a second time period of 1 to 30 minutes.

7. The method according to claim 1, wherein at least one of the first weight range or the second weight range comprises three kilograms.

8. The method according to claim 1, wherein the correction value lies in the range of 1 to 10 grams.

9. A device for recognizing a seat occupancy of a seat, which comprises a system configured and programmed to:
    detect at least one measuring signal with a seat occupancy sensor system;
    allocate the measuring signal by way of an allocation rule to a weight signal, which is representative of a weight with which the seat is occupied;
    adapt the allocation rule by allocating a then-current measuring signal to the weight signal reduced in amount by a predetermined percentage proportion of the weight signal, if the weight signal over the course of time is initially greater than a predetermined upper threshold value and if subsequently the weight signal, during a predetermined first duration, lies in a first weight range about the zero weight value;
    adapt the allocation rule by allocating a then-current measuring signal to the weight signal reduced in amount by a predetermined correction value of the weight signal, if the weight signal over the course of time is initially smaller than the predetermined upper threshold value and if subsequently the weight signal lies in a predetermined second weight range about zero weight during a predetermined second duration that is greater than the first duration.

* * * * *